Patented May 1, 1951

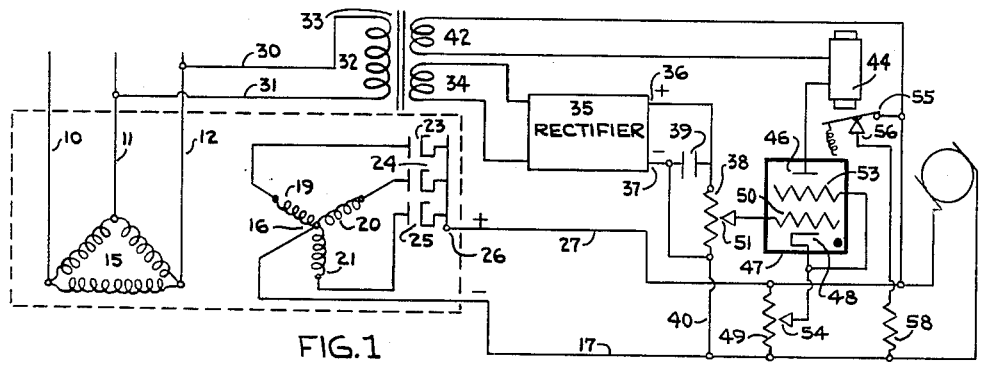

2,551,357

UNITED STATES PATENT OFFICE 2,551,357

REGENERATION CONTROL SYSTEM

Thomas W. White, Chicago, Ill., assignor to Goldberg & O'Brien Electric Co., Chicago, Ill., a corporation of Illinois Application February 26, 1949, Serial No. 78,591

2 Claims. (Cl. 318—368)

This invention relates to a control system and particularly for electric motor systems wherein the normal load on the motor may become negative and be a driving force for driving the motors as generators. Such systems are usually designated as regenerative in character. Thus a common example of a regenerative system is an elevator installation. Other examples are well known and while the invention is of general use, it is particularly useful in connection with elevator systems.

In most elevator systems driven by electric motors, the power supply line is usually alternating in character while the motors themselves are of the direct current type. A rectifier system is generally provided for supplying the motors. In a system of this character, it is impractical to convert and feed regenerated power from the motors into the alternating current supply line. Hence, the regenerated power as a rule is dissipated in resistors or other similar devices. This invention particularly relates to a regenerative system wherein a dissipative load is provided for absorbing the regenerated power under prescribed conditions.

In a regenerative system, it is essential that the dissipative load be connected only when the motor is functioning as a generator and that the load otherwise be disconnected therefrom. This has been accomplished in prior art systems by differential relay systems controlled by the potential existing across the motor terminals. Thus when the motor is operating and drawing power from the line, the potential across its terminals is usually lower than when the motor is functioning as a generator with no load. Under ideal conditions where line voltage is constant and where other voltages are constant, such a differential relay system may be quite satisfactory.

In practice, however, such a system has operating drawbacks. In particular, variations in line voltage due to other loads on the line tend to cause potential variations across the motor making it difficult and practically impossible for a simple differential relay system to operate. Furthermore, transient surges in the line will frequently trip the system from one condition to another with damaging results. In addition, the regenerated output potential developed by the motor must be built up to a substantial value before a simple differential relay system will operate. When the load is applied, the voltage at the motor terminals drops and may result in relay instability. In an elevator system for example, the motors must run at high speed before the relays will function. It is desirable that regeneration and braking incident to regeneration be effective almost immediately at the beginning of regeneration.

This invention provides a simple regeneration control system which is sensitive to motor conditions, positive in operation and will distinguish between regeneration and non-regeneration conditions quickly and with great sensitivity. The system involving the present invention is particularly advantageous in that it may be applied to conventional elevator systems with ease and at comparatively low cost.

The invention in general provides an electron discharge device adapted to cut-in or cut-off. The conducting condition of the device is changed with regeneration and a dissipation load will be connected across the motor only during regeneration. The potential across the motor terminals controls the conducting condition of the electron discharge device, the device being biased by a potential derived from the power line and substantially independent of the potential across the motor.

In order that the invention may be understood, it will be explained in connection with the drawing wherein Figure 1 shows a diagrammatic form of a system embodying the present invention. Figures 2 to 4 inclusive show modifications.

Referring to Figure 1, an alternating current power line here shown as a three phase system is illustrated by three conductors 10, 11 and 12. The three phase system is merely illustrative and in practice the power line may either be single phase, two phase or three phase as required. As shown here, the three phase line is connected to primary 15 of a polyphase transformer, the primary windings being connected in delta fashion. The Y connection may be used if desired. The transformer secondary has a Y connection, the neutral point indicated by number 16 being connected to load line 17. Neutral point 16 is connected to three windings, 19, 20 and 21 and these windings in turn are connected to half-wave rectifiers 23, 24 and 25 respectively. The cathodes of the rectifiers are connected to junction 26 and then to the positive terminal of load line 27. Any other kind of rectifier system may be used if desired. Thus load wires 17 and 27 may be considered as a direct current power supply for an elevator system. These load wires may go to any regenerative load consisting of one or more elevator installations.

Tapped off from the alternating current power line, are wires 30 and 31. These two wires may be taken from any two of the three wires and thus constitute a single phase source of control power. It is assumed that the three phase line 10, 11 and 12 is maintained in a substantially balanced condition as usual in power systems. Instead of a single phase tap, the three phases may be tapped. The tapped power supply, here shown as lines 30 and 31, are connected to primary 32 of transformer 33. Transformer 33 has one secondary 34 going to a second rectifier system 35. This second rectifier system may be of any type and may consist of four selenium rectifiers connected as a full wave system. Rectifier 35 has output terminals 36 and 37 across which is connected bias resistor 38 and condenser 39. Terminal 36 is positive while terminal 37 is negative. The negative terminal is connected by lead 40 to negative load line 17 of the direct current power system.

Transformer 33 has secondary 42, one terminal of which is connected to load line 27 and the other terminal of which is connected to winding 43 of relay 44. Winding 43 of the relay has its other terminal connected to anode 46 of gas tube 47. Gas tube 47 is of the grid controlled type available on the market under various trade names such as "Thyratron" for example. Thus tube 47 has cathode 48 which may be energized by a heater filament in the usual fashion in a manner well known in the art. Tube 47 has control grid 50 connected to contact 51 movable over resistor 38 for adjusting the bias potential thereof. Tube 47 has second grid 53 and cathode 48 connected to movable contact 54 cooperating with resistor 49 for adjusting the potential thereof. Relay 44 has movable and fixed contacts 55 and 56 connected through regeneration control resistor 58 across load lines 17 and 27.

The operation of this system is as follows: The main power lines 10 to 12 inclusive provide power and maintain load lines 17 and 27 energized in the usual fashion. Transformer 33 functions to provide a bias potential by means of winding 34 and rectifier system 35. This bias potential is impressed upon control grid 50 of gas tube 47. The adjustment of contact 51 on resistor 38 is such that gas tube 47 just fires when no load is present across load lines 17 and 27. It is understood that the control electrode regains control 60 times per second due to the 60 cycle anode potential supply. When a load is impressed across wires 17 and 27, the potential difference across these line wires will drop. If positive line 27 is assumed to be a reference point, the potential of negative line 17 will rise and become more positive. This means, therefore, that control grid 50 of tube 47 will become more positive and tube 47 will remain in a firing condition. Thus relay 44 remains energized with the contacts thereof open and resistor 58 is disconnected from line wires 17 and 27.

When the load regenerates, the potential across lines 17 and 27 increases. However, the potential across resistor 38 remains the same since that is governed by the main alternating current power line. The rise in potential across line wires 17 and 27 causes the control grid 50 of tube 47 to become more negative with respect to the cathode and results in tube 47 cutting off. This results in resistor 58 being connected across the line.

Cathode 48 may be connected directly to line 27 while resistor 49 may be omitted if desired. In case resistor 49 is omitted, the cathode circuit must be completed through the load or other part of the system. Resistor 38 may be quite high since practically no current is required for the grid circuit. Resistor 58 must be of suitable value for regeneration control.

Referring now to Figure 2, a modification is shown wherein the gas tube becomes conducting during regeneration. In this circuit, the positive terminals of the two rectifiers are connected. Cathode 48a of tube 47a is connected to negative load line 17a. The remaining connections are generally similar to those in Figure 1 except that relay 44a must close to connect resistor 58a across the load line. Assuming line 17a has a reference potential value, ground for example, then grid 50a should have its potential adjusted for no firing at no load. At full load, the potential of line 27a will drop causing grid 50a to be more negative. With regeneration, the potential of line 27a will rise, causing grid 50a to rise and permitting the tube to fire.

Referring now to Figure 3, a high vacuum diode is used. Rectifiers 60 and 61 have terminals 62 and 63 of like polarity, positive in this case, connected. Rectifier 60 feeds load lines 64 and 65. Rectifier 61 has resistor 67 and condenser 68 connected across it. Potentiometer wiper 70 is connected to anode 71 of diode 72. Cathode 73 is connected through relay 74 to line 64. Bias resistor 75 is preferably connected across the load lines. Relay 74, when energized, disposes dissipation resistor 77 across the line when regeneration occurs.

If line 64 is taken as a reference point, then wiper 70 is adjusted so that for no load, the anode of the diode is negative to the cathode, blocking the diode. Full load will drive the anode more negative. Regeneration will cause the potential of line 65 to rise, thus raising the potential of anode 71 to unblock the diode and cause conduction. The resulting space current will operate relay 74 and throw resistor 77 across the line.

Figure 4 shows a modification of the system of Figure 3 wherein the diode will block during regeneration. Thus the negative terminals of rectifiers 60a and 61a are tied together. The diode cathode is now connected to positive load line 65a. The remaining connections are the same as in Figure 3 except that relay 74a must be open to throw resistor 77a across the load lines. In this system, at no load wiper 70a will maintain anode 71a just positive enough to cathode 78a so the diode will conduct and keep relay 74a closed. At regeneration, line 64a becomes more negative to line 65a and pulls the potential of anode 71a down below that of the cathode to block the diode.

What is claimed is:

1. A regeneration control system comprising a power rectifier having output terminals for supplying a regenerative load with the output circuit potential varying from a minimum at full load to a maximum at regenerative load, a bias rectifier having output terminals across which is connected a resistor, said two rectifier systems being adapted to be supplied from a substantially constant potential alternating current source, a gaseous discharge device having a thermionic cathode, control grid and anode, a direct wire connection between the negative terminal of the power rectifier and negative terminal of the bias rectifier so that both negative terminals are at the same potential, a connection between the cathode and the positive output terminal of the power rectifier, a connection from a point on said resistor to said control grid, a source of high alternating potential connected in the anode cathode circuit, a regeneration load, means including a relay having contacts for connecting said regeneration load across the output terminals of said power rectifier, said relay having its winding in the cathode anode circuit to be controlled by said gas tube, the potential on said bias resistor applied to the control grid serving to maintain the gaseous discharge device normally conducting in the absence of regeneration and said device becoming nonconducting during regeneration conditions with said regeneration load being disposed across the power rectifier terminals upon regeneration.

2. The system according to claim 1 wherein the negative terminals of said two rectifier systems are connected together and wherein a resistor is connected across the power rectifier output terminals at all times, said last named resistor providing a return circuit for the space current through the tube.

THOMAS W. WHITE.

REFERENCES CITED

The following references are of record in the file of this patent:

UNITED STATES PATENTS

| Number | Name | Date |
|---|---|---|
| 1,633,831 | Thompson | June 28, 1927 |
| 2,190,523 | Rogers et al. | Feb. 13, 1940 |
| 2,469,899 | Sills | May 10, 1949 |